United States Patent
Tian (10) Patent No.: US 11,405,825 B2
(45) Date of Patent: Aug. 2, 2022

(54) LOAD BALANCING METHOD AND DEVICE

(71) Applicant: Huawei Technologies Co., Ltd., Shenzhen (CN)

(72) Inventor: Yibo Tian, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 36 days.

(21) Appl. No.: 17/128,688

(22) Filed: Dec. 21, 2020

(65) Prior Publication Data

US 2021/0112454 A1    Apr. 15, 2021

Related U.S. Application Data (63) Continuation of application No. PCT/CN2018/092397, filed on Jun. 22, 2018.

(51) Int. Cl.
*H04W 28/08* (2009.01)
*H04L 5/00* (2006.01)
*H04W 36/22* (2009.01)

(52) U.S. Cl.
CPC ....... *H04W 28/0812* (2020.05); *H04L 5/0048* (2013.01); *H04W 36/22* (2013.01)

(58) Field of Classification Search
CPC ............. H04W 28/0812; H04W 36/22; H04W 28/0975; H04W 28/0835; H04W 28/0808; H04L 5/0048; H04L 5/1469; H04L 5/0023; H04L 5/0032; H04L 5/0082; H04B 7/0617

See application file for complete search history.

(56) References Cited

U.S. PATENT DOCUMENTS 9,942,814 B1 * 4/2018 Pawar .................. H04B 7/0617
10,602,418 B2 * 3/2020 Stauffer ............ H04W 36/0072
(Continued)

FOREIGN PATENT DOCUMENTS

| CN | 101742565 A | 6/2010 |
| CN | 101754280 A | 6/2010 |

(Continued)

OTHER PUBLICATIONS

3GPP TS 36.211 V15.1.0 (Mar. 2018); 3rd Generation Partnership Project; Technical Specification Group Radio Access Network; Evolved Universal Terrestrial Radio Access (E-UTRA); Physical channels and modulation (Release 15); 221 pages.

*Primary Examiner* — Mounir Moutaouakil
(74) *Attorney, Agent, or Firm* — Slater Matsil, LLP (57) ABSTRACT

Embodiments of this application provide a load balancing method and a device. The method includes: determining, by a network device if periodicities of allocatable sounding reference signal SRS resources in a first cell are greater than periodicities of allocatable SRS resources in a second cell, a to-be-handed-over terminal based on transmission modes of terminals having accessed the first cell, where the first cell and the second cell are cells in a multi-carrier co-coverage network, and the network device covers the first cell and the second cell; and handing over, by the network device, the to-be-handed-over terminal to the second cell, where a periodicity of an SRS resource, allocated to the to-be-handed-over terminal, in the second cell is less than a periodicity of an SRS resource, allocated to the to-be-handed-over terminal, in the first cell.

17 Claims, 6 Drawing Sheets

(56) References Cited

U.S. PATENT DOCUMENTS

| | | | |
|---|---|---|---|
| 11,223,967 B2 * | 1/2022 | Lee | H04B 7/0617 |
| 2012/0320874 A1 | 12/2012 | Li et al. | |
| 2012/0331478 A1 | 12/2012 | Zhu et al. | |
| 2013/0229989 A1 | 9/2013 | Natarajan et al. | |
| 2015/0172990 A1 * | 6/2015 | Patel | H04W 36/00837 370/332 |
| 2017/0215078 A1 * | 7/2017 | Mochizuki | H04W 72/04 |
| 2018/0049079 A1 | 2/2018 | Ozturk et al. | |
| 2018/0199252 A1 * | 7/2018 | Pawar | H04B 7/0695 |

FOREIGN PATENT DOCUMENTS

| | | | |
|---|---|---|---|
| CN | 105075322 A * | 11/2015 | H04B 7/0619 |
| CN | 106341853 A | 1/2017 | |
| CN | 107566101 A | 1/2018 | |
| CN | 109076464 A * | 12/2018 | H04W 52/146 |
| EP | 2334122 A1 | 6/2011 | |
| WO | WO-2011005164 A1 * | 1/2011 | H04W 36/24 |
| WO | WO-2013169394 A2 * | 11/2013 | H04B 17/309 |
| WO | 2017173388 A1 | 10/2017 | |
| WO | 2017190659 A1 | 11/2017 | |

\* cited by examiner

A network device determines, if periodicities of allocatable sounding reference signal SRS resources in a first cell are greater than periodicities of allocatable SRS resources in a second cell, a to-be-handed-over terminal based on transmission modes of terminals having accessed the first cell, where the first cell and the second cell are cells in a multi-carrier co-coverage network, and the network device covers the first cell and the second cell ⸺ S401

The network device hands over the to-be-handed-over terminal to the second cell, where a periodicity of an SRS resource, allocated to the to-be-handed-over terminal, in the second cell is less than a periodicity of an SRS resource, allocated to the to-be-handed-over terminal, in the first cell ⸺ S402

LOAD BALANCING METHOD AND DEVICE

CROSS-REFERENCE TO RELATED APPLICATIONS

This application is a continuation of International Application No. PCT/CN2018/092397, filed on Jun. 22, 2018, the disclosure of which is hereby incorporated by reference in its entirety.

TECHNICAL FIELD

Embodiments of this application relate to the field of communications technologies, and in particular, to a load balancing method and a device.

BACKGROUND

In a long term evolution (LTE) communications system, a terminal may periodically send a sounding reference signal (SRS) to a base station, and the base station demodulates the SRS signal, thereby obtaining uplink channel quality.

To enable the terminal to send an uplink SRS on a specified physical resource, the base station needs to allocate a specific physical resource, that is, an SRS resource, to each terminal. Currently, SRS resources that can be allocated by the base station include a cell-level SRS resource and a user-level SRS resource. The user-level SRS resource is a subset of the cell-level SRS resource. That is, the user-level SRS resource needs to be selected from the cell-level SRS resource.

However, a total quantity of cell-level SRS resources is fixed, and therefore, a quantity of terminals to which SRS resources can be allocated is limited. After the SRS resources are exhausted, an SRS resource cannot be allocated to a terminal. Therefore, a load balancing method is urgently needed, so that an SRS resource can be allocated to a terminal.

SUMMARY

Embodiments of this application provide a load balancing method and a device, to increase, through load balance, a beamforming gain of a terminal handed over from a current cell to another cell, and enable a terminal accessing the current cell to obtain an SRS resource.

According to a first aspect, an embodiment of this application provides a load balancing method, including:

If periodicities of allocatable sounding reference signal SRS resources in a first cell are greater than periodicities of allocatable SRS resources in a second cell, a network device determines a to-be-handed-over terminal based on transmission modes of terminals having accessed the first cell. Frequencies of the first cell and the second cell are different, but coverage of the first cell and the second cell is the same. The network device may cover the first cell and the second cell.

The network device hands over the to-be-handed-over terminal to the second cell. After the to-be-handed-over terminal is handed over to the second cell, the network device allocates an resource whose periodicity is the shortest in the allocatable resources in the second cell to the to-be-handed-over terminal, so that a periodicity of an SRS resource, allocated to the to-be-handed-over terminal, in the second cell is less than a periodicity of an SRS resource, allocated to the to-be-handed-over terminal, in the first cell, thereby implementing load balance; and an SRS resource can be allocated to a terminal that needs to access the first cell, the terminal that is to access the first cell can obtain a shorter SRS resource after being handed over to the second cell, and the to-be-handed-over terminal can increase a beamforming gain.

In a possible design, that a network device determines a to-be-handed-over terminal based on transmission modes of terminals having accessed the first cell includes:

If there are one or more target terminals whose transmission modes are a beamforming BF transmission mode in the terminals having accessed the first cell, the network device determines the to-be-handed-over terminal in the target terminals. A BF gain can be obtained when a transmission mode of a terminal is the beamforming transmission mode and when an SRS resource allocated to the terminal is a short-periodicity resource, for example, when a periodicity of the SRS resource allocated to the terminal is less than a preset periodicity.

In a possible design, that the network device determines the to-be-handed-over terminal in the target terminals includes:

The network device determines the to-be-handed-over terminal based on periodicities of SRS resources allocated to the target terminals. For example, a target terminal may be sequentially selected, from a plurality of target terminals, as the to-be-handed-over terminal according to a preset rule. The preset rule may be sequentially selecting a target terminal in descending order of the periodicities of the SRS resources allocated to the target terminals. The periodicity of the SRS resource, allocated to the to-be-handed-over terminal, in the first cell is greater than a shortest periodicity of the allocatable SRS resources in the second cell. After the to-be-handed-over terminal is handed over to the second cell, the network device allocates an SRS resource whose periodicity is the shortest in the second cell to the to-be-handed-over terminal according to a resource allocation principle of first allocating a short-periodicity resource and then allocating a long-periodicity resource, thereby increasing a BF gain of the to-be-handed-over terminal.

In a possible design, the method further includes: If there is no target terminal whose transmission mode is the BF transmission mode in the terminals having accessed the first cell, the network device determines a terminal that is to access the first cell as the to-be-handed-over terminal.

In a possible design, that the network device hands over the to-be-handed-over terminal to the second cell includes:

The network device sends a handover instruction to the to-be-handed-over terminal, where the handover instruction is used to instruct the to-be-handed-over terminal to be handed over to the second cell.

The network device receives, from the to-be-handed-over terminal, a handover response used to indicate that the handover succeeds.

In a possible design, the method further includes:

The network device receives an access request from the terminal that is to access the first cell.

After the network device hands over the to-be-handed-over terminal to the second cell, the method further includes:

The network device releases the SRS resource, allocated to the to-be-handed-over terminal, in the first cell, and determines a periodicity of a target resource in the periodicities of the allocatable SRS resources in the first cell. The target resource is an SRS resource that is to be allocated to the terminal that is to access the first cell. The network device sends a connection response to the terminal that is to access the first cell, where the connection response includes the periodicity of the target resource.

After receiving the access request, sent by the terminal that is to access the first cell, for accessing the first cell, the network device triggers a load balancing process. When there is the to-be-handed-over terminal that can be handed over, the network device controls the to-be-handed-over terminal to be handed over to the second cell, so that the SRS resource of the to-be-handed-over terminals in the first cell can be released. In this way, the to-be-handed-over terminal can increase the BF gain in the second cell, and the terminal that is to access the first cell can obtain a short-periodicity SRS resource in the first cell, and may obtain a BF gain.

In a possible design, before the network device sends the connection response to the terminal that is to access the first cell, the method further includes:

The network device determines a transmission mode of the terminal that is to access the first cell, where the connection response further includes the transmission mode of the terminal that is to access the first cell.

In a possible design, before the network device hands over the to-be-handed-over terminal to the second cell, the method further includes:

The network device receives an SRS sent by a terminal, having accessed the first cell, whose transmission mode is the BF transmission mode.

The network device adjusts an antenna array of the network device based on the SRS.

According to a second aspect, an embodiment of this application provides a network device, including:

a processing module, configured to determine, if periodicities of allocatable sounding reference signal SRS resources in a first cell are greater than periodicities of allocatable SRS resources in a second cell, a to-be-handed-over terminal based on transmission modes of terminals having accessed the first cell, where the first cell and the second cell are cells in a multi-carrier co-coverage network, and the network device covers the first cell and the second cell, where the processing module is further configured to hand over the to-be-handed-over terminal to the second cell, where a periodicity of an SRS resource, allocated to the to-be-handed-over terminal, in the second cell is less than a periodicity of an SRS resource, allocated to the to-be-handed-over terminal, in the first cell.

In a possible design, the processing module is specifically configured to:

determine, if there are one or more target terminals whose transmission modes are a beamforming BF transmission mode in the terminals having accessed the first cell, the to-be-handed-over terminal in the target terminals, where an SRS resource corresponding to the BF transmission mode is an SRS resource whose periodicity is less than a preset periodicity.

In a possible design, the processing module is specifically configured to:

determine the to-be-handed-over terminal based on periodicities of SRS resources allocated to the target terminals, where the periodicity of the SRS resource, allocated to the to-be-handed-over terminal, in the first cell is greater than a shortest periodicity of the allocatable SRS resources in the second cell.

In a possible design, the processing module is further configured to:

determine, if there is no target terminal whose transmission mode is the BF transmission mode in the terminals having accessed the first cell, a terminal that is to access the first cell as the to-be-handed-over terminal.

In a possible design, the network device further includes: a sending module and a receiving module, where the processing module is specifically configured to send a handover instruction to the to-be-handed-over terminal through the sending module, where the handover instruction is used to instruct the to-be-handed-over terminal to be handed over to the second cell; and the processing module is specifically configured to receive, from the to-be-handed-over terminal through the receiving module, a handover response used to indicate that the handover succeeds.

In a possible design, the network device further includes: a sending module and a receiving module, where the processing module is specifically configured to receive, through the receiving module, an access request from the terminal that is to access the first cell;

the processing module is further configured to: after handing over the to-be-handed-over terminal to the second cell, release the SRS resource, allocated to the to-be-handed-over terminal, in the first cell; and determine a periodicity of a target resource in the periodicities of the allocatable SRS resources in the first cell, where the target resource is an SRS resource that is to be allocated to the terminal that is to access the first cell; and the processing module is further configured to: send, through the sending module, a connection response to the terminal that is to access the first cell, where the connection response includes the periodicity of the target resource.

In a possible design, the processing module is further configured to: before sending the connection response to the terminal that is to access the first cell, determine a transmission mode of the terminal that is to access the first cell, where the connection response further includes the transmission mode of the terminal that is to access the first cell.

In a possible design, the processing module is further configured to: receive, before handing over the to-be-handed-over terminal to the second cell, an SRS sent by a terminal, having accessed the first cell, whose transmission mode is the BF transmission mode; and adjust an antenna array of the network device based on the SRS.

According to a third aspect, an embodiment of this application provides a network device, including: at least one processor and a memory, where the memory stores a computer-executable instruction; and the at least one processor executes the computer-executable instruction stored in the memory, so that the at least one processor performs the method according to any one of the first aspect or the possible designs of the first aspect.

According to a fourth aspect, an embodiment of this application provides a computer-readable storage medium, where the computer-readable storage medium stores a computer-executable instruction, and when the computer-executable instruction is executed, the method according to any one of the first aspect or the possible designs of the first aspect is implemented.

According to a fifth aspect, an embodiment of this application further provides a computer program product, where the computer program product includes computer program code, and when the computer program code is run on a computer, the computer is enabled to perform the method according to any one of the first aspect or the possible designs of the first aspect.

According to a sixth aspect, an embodiment of this application further provides a chip, including a memory and a processor, where the memory is configured to store a computer-executable instruction, and the processor is configured to invoke the computer-executable instruction from the memory and run the computer-executable instruction, so that the chip performs the method according to any one of the first aspect or the possible designs of the first aspect.

According to the SRS-resource-based load balancing method and the device that are provided in the embodiments, if the periodicities of the allocatable SRS resources in the first cell are greater than the periodicities of the allocatable SRS resources in the second cell, the network device determines the to-be-handed-over terminal based on the transmission modes of the terminals having accessed the first cell. The to-be-handed-over terminal is determined based on the transmission modes, so that a terminal whose transmission mode is the BF transmission mode can be determined as the to-be-handed-over terminal. The network device hands over the to-be-handed-over terminal to the second cell, and allocates the resource whose periodicity is the shortest in the allocatable resources in the second cell to the to-be-handed-over terminal, where the periodicity of the SRS resource, allocated to the to-be-handed-over terminal, in the second cell is less than the periodicity of the SRS resource, allocated to the to-be-handed-over terminal, in the first cell, so that the terminal having the BF transmission mode is handed over from the first cell to the second cell, thereby implementing load balance; and the SRS resource can be allocated to the terminal that needs to access the first cell, the terminal that is to access the first cell can obtain the shorter SRS resource after being handed over to the second cell, and the to-be-handed-over terminal can increase the beamforming gain.

DETAILED DESCRIPTION OF ILLUSTRATIVE EMBODIMENTS

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may know that, with evolution of the network architecture and emergence of new service scenarios, the technical solutions provided in the embodiments of this application are also applicable to similar technical problems.

The embodiments of this application may be applied to a wireless communications system. It should be noted that, the wireless communications system in the embodiments of this application includes, but is not limited to: a narrowband internet of things (NB-IoT) system, a global system for mobile communications (GSM) system, an enhanced data rates for GSM evolution (EDGE) system, a wideband code division multiple access (WCDMA) system, a code division multiple access 2000 (CDMA2000) system, a time division-synchronous code division multiple access (TD-SCDMA) system, a LTE system, and a next generation 5G mobile communications system.

Figure 1:
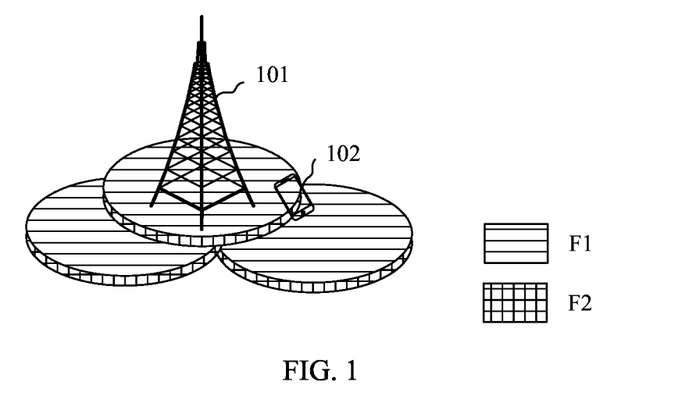
FIG. 1 is a schematic diagram of a network architecture to which an embodiment of this application may be applicable.

The following describes a possible network architecture according to an embodiment of this application with reference to FIG. 1. FIG. 1 is a schematic diagram of a network architecture to which an embodiment of this application may be applicable. As shown in FIG. 1, the network architecture provided in this embodiment includes a network device 101 and a terminal 102.

The network device 101 is a device that connects a terminal to a wireless network, and may be a base transceiver station (BTS) in GSM or code division multiple access (CDMA), an NB in WCDMA, an evolved NodeB (eNB) in LTE, a relay node, an access point, a network side device (such as a base station) in a future 5G network, a network device in a future evolved public land mobile network (PLMN), or the like. This is not limited herein. FIG. 1 is a possible schematic diagram, and an example in which the network device 101 is a base station is used for illustration.

The terminal 102 may be a wireless terminal or a wired terminal. The wireless terminal may be a device that provides a user with voice and/or other service data connectivity, a hand-held device having a wireless connection function, or another processing device connected to a wireless modem. The wireless terminal may communicate with one or more core networks through a radio access network (RAN). The wireless terminal may be a mobile terminal such as a mobile phone (also referred to as a cellular phone) or a computer including a mobile terminal, for example, may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may alternatively be referred to as a system, a subscriber unit a subscriber station, a mobile station (Mobile), a remote station, a remote terminal, an access terminal, a user terminal, or a user agent. This is not limited herein. FIG. 1 is a possible schematic diagram, and an example in which the terminal 102 is a mobile telephone is used for illustration.

In this embodiment, the communications system may provide multi-carrier co-coverage networking. The multi-carrier co-coverage networking means performing coverage networking in each sector direction by using two or more carriers (where each carrier is a cell). Using networking with two carriers as an example, as shown in FIG. 1, frequencies are F1 and F2, where F1 and F2 cover completely same areas. In a two-carrier co-coverage network, a terminal can be served by two cells at a same location.

Further, in a LTE communications system, the terminal may periodically send an SRS to the network device, and the network device demodulates the SRS signal, thereby obtaining uplink channel quality.

An SRS resource has characteristics such as being periodic, frequency division or code division, and being in a comb structure. Allocation of SRS resources includes a cell-level SRS resource and a user-level SRS resource. The SRS resource is a resource used to transmit an SRS.

In a possible implementation, the cell-level SRS resource includes resources whose subframe periodicities are 5 ms and 10 ms, and is determined based on a time division duplex (TDD) frame structure. For example, in a configured cell-level SRS subframe, if the subframe is a normal uplink subframe, the last symbol of the subframe is used to transmit an SRS, and cannot be used to transmit data. Otherwise, the data causes interference to the SRS. If the subframe is a special subframe, one or two symbols of the special subframe are used to transmit an SRS.

In a possible implementation, in a TDD mode, subframe periodicities corresponding to the user-level SRS resource are {5, 10, 20, 40, 80, 160, 320} ms. An SRS resource allocated to a user needs to be configured in an SRS subframe of a cell, and the user-level SRS resource is a subset of the cell-level SRS resource. A person skilled in the art may understand that, when the SRS resource is allocated to the user, the SRS resource is actually allocated to a terminal corresponding to the user.

In a TDD system, in comprehensive consideration of an uplink throughput and a capacity of a cell, in an LTE TDD system, SRS resources allocated to the cell are limited. Therefore, SRS resources that can be allocated to users accessing the cell are also limited.

After an allocation solution of the cell-level SRS resources is determined, a specification of a quantity of users to which the SRS resources can be allocated is restricted by the following factors: a periodicity, code division, a quantity of single-user resource blocks (RB), a quantity of symbols, and the like. For the user-level SRS resource, in different SRS resource allocation periodicities, a specification of a quantity of accessing users allocated to a current SRS resource periodicity is limited. If the specification is exceeded, a newly accessing user is allocated to a next SRS resource allocation periodicity.

For example, when SRS resources are allocated to a user, a short-periodicity resource is first allocated, that is, a resource whose subframe periodicity is 5 ms is first allocated to a terminal, and when there is no available resource, a resource whose subframe periodicity is 10 ms is then allocated. The rest can be deduced by analogy until cell-level SRS resources are exhausted. After the cell-level SRS resources are exhausted, the SRS resources are no longer allocated to the terminal (unless another terminal releases an SRS resource).

When the SRS resources allocated to the terminal are short-periodicity resources, and when a transmission mode is a beamforming (BF) transmission mode, a BF gain can be obtained. The following describes related content of beamforming in detail.

Specifically, the beamforming is a signal preprocessing technology based on an antenna array. A weighting coefficient of each array element in the antenna array is adjusted to generate a directional beam, so that an obvious array gain can be obtained. This significantly helps increase a demodulation signal-to-noise ratio of a target user and a cell edge user throughput. A weight varies with a radio channel environment, to ensure that the beam is always towards the target user.

Figure 2:
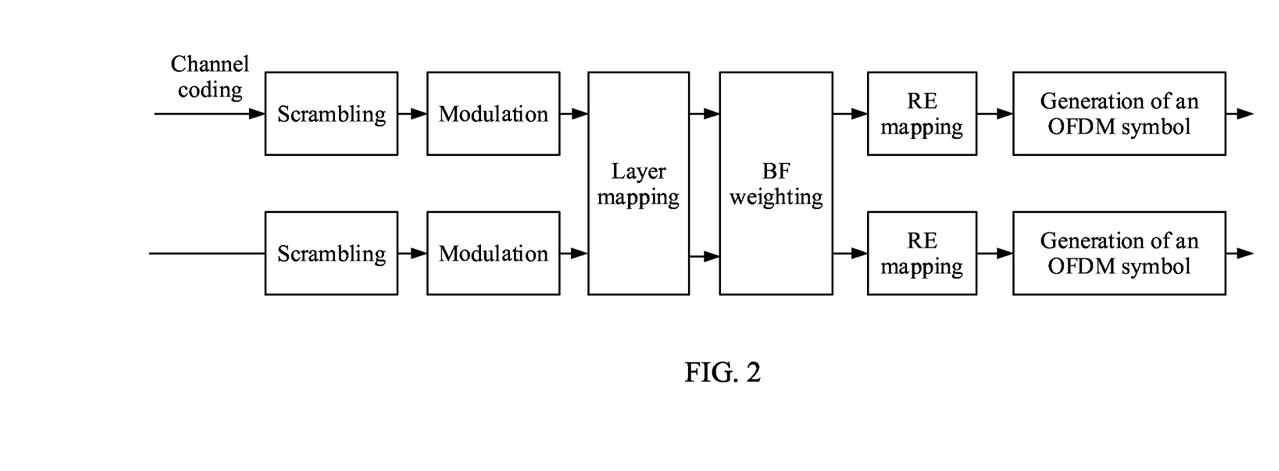
FIG. 2 is a schematic diagram of implementation of downlink beamforming according to an embodiment of this application.

FIG. 2 is a schematic diagram of generation of an OFDM symbol according to an embodiment of this application. As shown in FIG. 2, when performing downlink transmission, after completing channel coding, a network device performs scrambling, modulation, and layer mapping on encoded bits, performs BF weighted processing after completing the layer mapping, and finally obtains the OFDM symbol through resource element (RE) mapping. Specifically, in a BF weighted processing process in TDD, weight calculation means calculating, by using uplink channel estimation information (an SRS) and reciprocity between uplink and downlink channels in TDD, a weight vector related to a downlink channel. Downlink beamforming is performed based on the weight vector.

Figure 3:
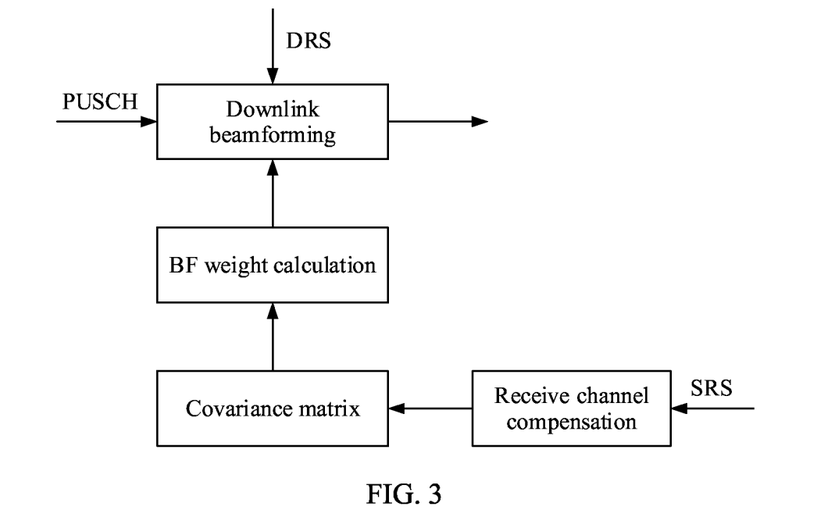
FIG. 3 is a schematic diagram of implementation of downlink beamforming according to an embodiment of this application.

FIG. 3 is a schematic diagram of implementation of downlink beamforming according to an embodiment of this application. As shown in FIG. 3, after receiving an SRS sent by a terminal, a network device performs uplink channel estimation, performs receive channel compensation based on the uplink channel estimation, then calculates and maintains a covariance matrix of each user based on the uplink channel estimation, performs eigenvalue decomposition on the covariance matrix to obtain BF weight vector estimation, and performs downlink beamforming based on the BF weight vector estimation, related information about a physical uplink shared channel (PUSCH), and a demodulation reference signal (DRS).

It can be learned that, to ensure timely update of a BF weight of a mobile user, a short-periodicity SRS resource needs to be selected and allocated to the mobile user.

Further, the BF transmission mode (TM) includes a single-stream BF transmission mode, a dual-stream BF transmission mode, and a multi-user BF (MUBF) transmission mode. In the single-stream transmission mode, one antenna port is used, and data is mapped onto one layer when layer mapping is performed on the data after the data is modulated. In the dual-stream transmission mode, two antenna ports are used, and data is mapped onto two layers when layer mapping is performed on the data after the data is modulated. In the MUBF transmission mode, a plurality of pieces of downlink user data are multiplexed to a same time-frequency resource by using high channel correlation between antennas and channel spatial diversity between different users, thereby increasing a network capacity and a cell throughput. When terminal antennas are highly correlated, a user cannot perform multi-stream transmission, and performance bottlenecks are consequently caused. However, in the MUBF transmission mode, the channel spatial diversity between different users is used, to obtain a greater spatial degree of freedom to multiplex a plurality of streams, thereby obtaining a gain. A difference between the dual-stream BF transmission mode and the MUBF transmission mode lies in that, in the dual-stream BF transmission mode, two pieces of codeword data are allocated to one user; and in the MUBF transmission mode, two pieces of codeword data are respectively allocated to two different users.

In the embodiments, when load of SRS resources is balanced, an SRS resource can be allocated to a newly accessing user, and a BF gain is fully considered, so that a terminal can obtain the BF gain as much as possible. The following describes in detail, by using detailed embodiments, a specific implementation process of an SRS-resource-based load balancing method provided in the embodiments of this application.

Figure 4:
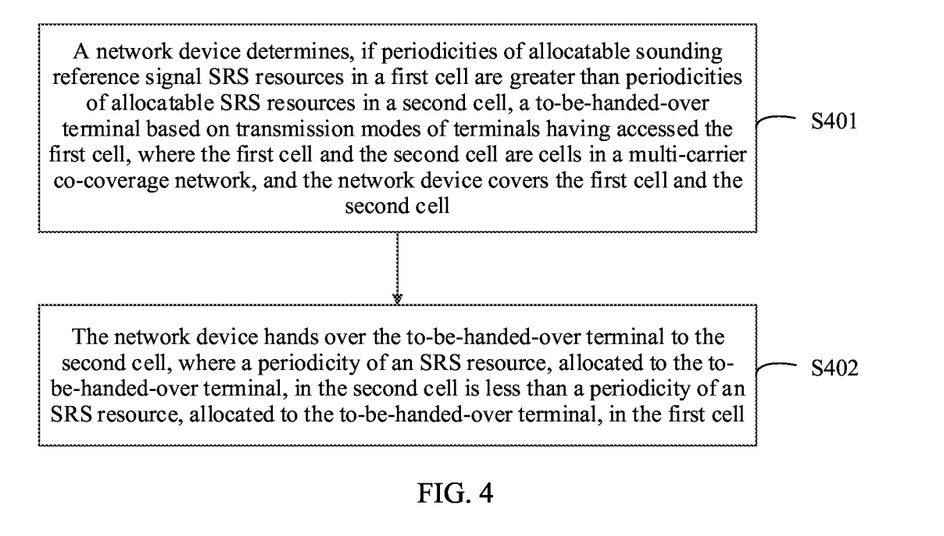
FIG. 4 is a first schematic flowchart of a load balancing method according to an embodiment of this application.

FIG. 4 is a first schematic flowchart of a load balancing method according to an embodiment of this application. As shown in FIG. 4, the method includes the following steps:

S401. A network device determines, if periodicities of allocatable sounding reference signal SRS resources in a first cell are greater than periodicities of allocatable SRS resources in a second cell, a to-be-handed-over terminal based on transmission modes of terminals having accessed the first cell, where the first cell and the second cell are cells in multi-carrier co-coverage networking, and the network device covers the first cell and the second cell.

In a specific implementation process, when the network device is initially set, a cell covered by the network device may be configured based on cell configuration information. The configuration includes, for example, a multi-carrier configuration, transmit power of each carrier, a configuration of a cell-level SRS resource, and a configuration of a user-level SRS resource.

For example, the multi-carrier configuration is, as shown in FIG. 1, configurations of carriers, covering each cell, at different frequencies. Using FIG. 1 as an example, the network device corresponds to six cells, where two cells that overlap each other in a vertical direction are multi-carrier co-coverage cells. A person skilled in the art may understand that, there may be two or more multi-carrier co-coverage cells, and a quantity of multi-carrier co-coverage cells is not particularly limited in this embodiment.

The configuration of the cell-level SRS resource may include a periodicity of the cell-level SRS resource. The periodicity of the cell-level SRS resource is specifically a periodicity of a subframe for transmitting an SRS, and the periodicity of the subframe is, for example, 5 ms or 10 ms. An example in which the periodicity of the subframe is 5 ms, and a length of each subframe is 1 ms is used for description. In other words, one of every five subframes is used to transmit an SRS. For example, the first subframe, the sixth subframe, the eleventh subframe, and the like are used to transmit an SRS. Configurations of cell-level SRS resources of all cells may be the same or may be different. This is not particularly limited herein in this embodiment.

The configuration of the user-level SRS resource is similar to the configuration of the cell-level SRS resource. A difference is that the user-level SRS resource is a subset of the cell-level SRS resource.

After the network device is configured, the network device may store the cell configuration information. When the cell covered by the network device starts to work, a terminal may access the cell covered by the network device. The network device may select a user-level SRS resource from the cell-level SRS resource, allocate the user-level SRS resource to the terminal, and dynamically store SRS resources in the cell covered by the network device, to learn about remaining SRS resources of each cell in real time. The user-level SRS resource may be sent to the terminal by using a radio resource control protocol (RRC) connection message (Connection Reconfiguration).

When the terminal accesses the cell covered by the network device, the network device further determines a transmission mode of the terminal. In a possible example of the transmission mode, there are nine transmission modes (TMs) in LTE. The nine transmission modes are respectively a TM 1: single-antenna port transmission; a TM 2: a transmit diversity mode; a TM 3: open-loop space diversity; a TM 4: closed-loop space diversity; a TM 5: a multi-user multiple-input multiple-output (MU-MIMO) transmission mode; a TM 6: rank-1 transmission; a TM 7: a single-stream beamforming mode; a TM 8: a dual-stream beamforming mode; and a TM 9 supporting transmission of a maximum of eight layers. The network device may determine the transmission mode of the terminal based on factors such as a location of the terminal in the cell, a channel status, and a moving speed of the terminal. A specific implementation of determining, by the network device, the transmission mode of the terminal is not particularly limited in this embodiment, provided that the network device can determine the transmission mode of the terminal.

The TM 7 and the TM 8 correspond to a BF transmission mode. When the terminal performs transmission in the TM 7 or the TM 8, an SRS resource allocated by the network device to the terminal is a short-periodicity resource. For example, a subframe periodicity is 5, 10, 20, or 40 ms.

The network device may determine SRS-resource-based load of each cell in real time or based on a preset periodicity, and then perform load balancing based on the load. Specifically, for any cell (where in this embodiment, the cell is referred to as a first cell for differentiation herein), a multi-carrier co-coverage cell of the first cell is referred to as a second cell. There may be at least one second cell, that is, there may be one or more second cells, and the network device covers both the first cell and the second cell.

In a load balancing process, the network device determines whether the periodicities of the allocatable SRS resources in the first cell are greater than the periodicities of the allocatable SRS resources in the second cell. The allocatable SRS resources are remaining SRS resources that are not allocated.

In a specific comparison process, a shortest periodicity of the allocatable SRS resources in the first cell is compared with the periodicities of the allocatable SRS resources in the second cell. For example, the shortest periodicity of the allocatable SRS resources in the first cell is 160 ms, and the periodicities of the allocatable SRS resources in the second cell are 20 ms, 40 ms, 160 ms, and 320 ms. It can be learned that, the shortest periodicity, which is 160 ms, of the allocatable SRS resources in the first cell is greater than the periodicities, which are 20 ms and 40 ms, of the allocatable SRS resources in the second cell. A person skilled in the art may understand that, the shortest periodicity of the allocatable SRS resources in the first cell may alternatively be compared with a shortest periodicity of the allocatable SRS resources in the second cell, so that the network device determines whether the shortest periodicity of the allocatable SRS resources in the first cell is greater than the shortest periodicity of the allocatable SRS resources in the second cell.

If the periodicities of the allocatable SRS resources in the first cell are greater than the periodicities of the allocatable SRS resources in the second cell, the network device determines the to-be-handed-over terminal based on the transmission modes of the terminals having accessed the first cell.

It can be learned from the foregoing that, terminals have a plurality of transmission modes. Because a BF gain needs to be considered in this embodiment of this application, a terminal whose transmission mode is the BF transmission mode may be used as a candidate to-be-handed-over terminal, and another terminal is not used as a candidate to-be-handed-over terminal.

Specifically, the network device determines whether there are one or more target terminals whose transmission modes are the beamforming BF transmission mode in the terminals having accessed the first cell, where an SRS resource corresponding to the BF transmission mode is an SRS resource whose periodicity is less than a preset periodicity. To be specific, as described above, the network device allocates a short-periodicity SRS resource to a terminal having the BF transmission mode. If there are one or more target terminals whose transmission modes are the BF transmission mode in the terminals having accessed the first cell, that is, the target terminals in this embodiment of this application are terminals, having accessed the first cell, whose transmission modes are the BF transmission mode, the network device determines the to-be-handed-over terminal in the target terminals whose transmission modes are the BF transmission mode.

Optionally, the BF transmission mode is the single-stream BF transmission mode, or a single-stream user in the MUBF. The MUBF includes a transmission mode for user pairing, and each paired user is a single-stream user. When the transmission mode of the terminal is the dual-stream BF transmission mode, a BF gain obtained by the terminal is relatively large, and therefore the terminal does not need to be handed over to the second cell.

In a specific implementation process, the network device determines the to-be-handed-over terminal based on periodicities of SRS resources allocated to the target terminals. A periodicity of an SRS resource, allocated to the to-be-handed-over terminal, in the first cell is greater than the shortest periodicity of the allocatable SRS resources in the second cell.

In a specific implementation process, target terminals may be sequentially selected, from a plurality of target terminals, as to-be-handed-over terminals according to a preset rule. The preset rule may be, for example, sequentially selecting target terminals in descending order of the periodicities of the SRS resources allocated to the target terminals.

Specifically, the target terminals are sequentially selected, from the plurality of target terminals, as the to-be-handed-over terminals according to the preset rule. A target terminal is no longer selected as a to-be-handed-over terminal when a periodicity of an allocatable SRS resource in the second cell is equal to one of periodicities of the target terminals, or all the target terminals are already used as the to-be-handed-over terminals before a periodicity of an allocatable SRS resource in the second cell is equal to one of periodicities of the target terminals. The following uses a specific example for description.

For example, there are seven target terminals, where periodicities of SRS resources allocated to two of the target terminals are 40 ms, periodicities of SRS resources allocated to three of the target terminals are 80 ms, and periodicities of SRS resources allocated to remaining two of the target terminals are 160 ms. The periodicities of the allocatable SRS resources in the second cell are 80 ms, 160 ms, and 320 ms. In this case, the to-be-handed-over terminal is determined in the target terminals to which the SRS resources whose periodicities are 160 ms are allocated. When the to-be-handed-over terminal is handed over to the second cell, the network device allocates a shortest SRS resource in the second cell to the to-be-handed-over terminal, that is, a periodicity of an SRS resource allocated to the to-be-handed-over terminal is 80 ms.

That is, an objective of selecting the to-be-handed-over terminal in this embodiment is to ensure that, after the terminal is handed over to the second cell, a periodicity of an SRS resource allocated to the terminal is less than a periodicity of an SRS resource allocated to the terminal, in the first cell, so that the BF gain obtained by the terminal is increased.

S402. The network device hands over the to-be-handed-over terminal to the second cell, where a periodicity of an SRS resource, allocated to the to-be-handed-over terminal, in the second cell is less than a periodicity of an SRS resource, allocated to the to-be-handed-over terminal, in the first cell.

After determining the to-be-handed-over terminal, the network device hands over the to-be-handed-over terminal to the second cell. Specifically, the handover is a load-based handover, and is an intra-station handover. To be specific, the terminal is handed over from one cell of the network device to another cell of the network device, in other words, a handover process is limited to one network device.

During the handover, the network device sends a handover instruction to the to-be-handed-over terminal, where the handover instruction is used to instruct the to-be-handed-over terminal to be handed over to the second cell. The handover instruction may be sent to the to-be-handed-over terminal by using an RRC reconfiguration message (Connection Reconfiguration). After the to-be-handed-over terminal is successfully handed over to the second cell, the to-be-handed-over terminal sends, to the network device, a handover response used to indicate that the handover succeeds.

After the to-be-handed-over terminal is successfully handed over, the network device releases the SRS resource, allocated to the to-be-handed-over terminal, in the first cell, and simultaneously allocates an allocatable short-periodicity SRS resource in the second cell to the to-be-handed-over terminal. For example, the handover instruction may carry a periodicity of the short-periodicity resource, or a periodicity of the short-periodicity resource may be sent to the to-be-handed-over terminal by using another message. It can be learned from the foregoing that, the periodicity of the SRS resource, allocated to the to-be-handed-over terminal, in the second cell is less than the periodicity of the SRS resource, allocated to the to-be-handed-over terminal, in the first cell.

According to the SRS-resource-based load balancing method provided in this embodiment, if the periodicities of the allocatable SRS resources in the first cell are greater than the periodicities of the allocatable SRS resources in the second cell, the network device determines the to-be-handed-over terminal based on the transmission modes of the terminals having accessed the first cell. The to-be-handed-over terminal is determined based on the transmission modes, so that a terminal whose transmission mode is the BF transmission mode can be determined as the to-be-handed-over terminal. The network device hands over the to-be-handed-over terminal to the second cell, and allocates the resource whose periodicity is the shortest in the allocatable resources in the second cell to the to-be-handed-over terminal, where the periodicity of the SRS resource, allocated to the to-be-handed-over terminal, in the second cell is less than the periodicity of the SRS resource, allocated to the to-be-handed-over terminal, in the first cell, so that the terminal having the BF transmission mode is handed over from the first cell to the second cell, thereby implementing load balance; and the SRS resource can be allocated to the terminal that needs to access the first cell, the terminal that is to access the first cell can obtain the shorter SRS resource after being handed over to the second cell, and the to-be-handed-over terminal can increase the beamforming gain.

Based on the foregoing embodiment, the network device not only can independently trigger a load balancing process, but also can trigger the load balancing process when there is a terminal having accessed the first cell. The following separately provides detailed descriptions by using two specific embodiments.

Figure 5:
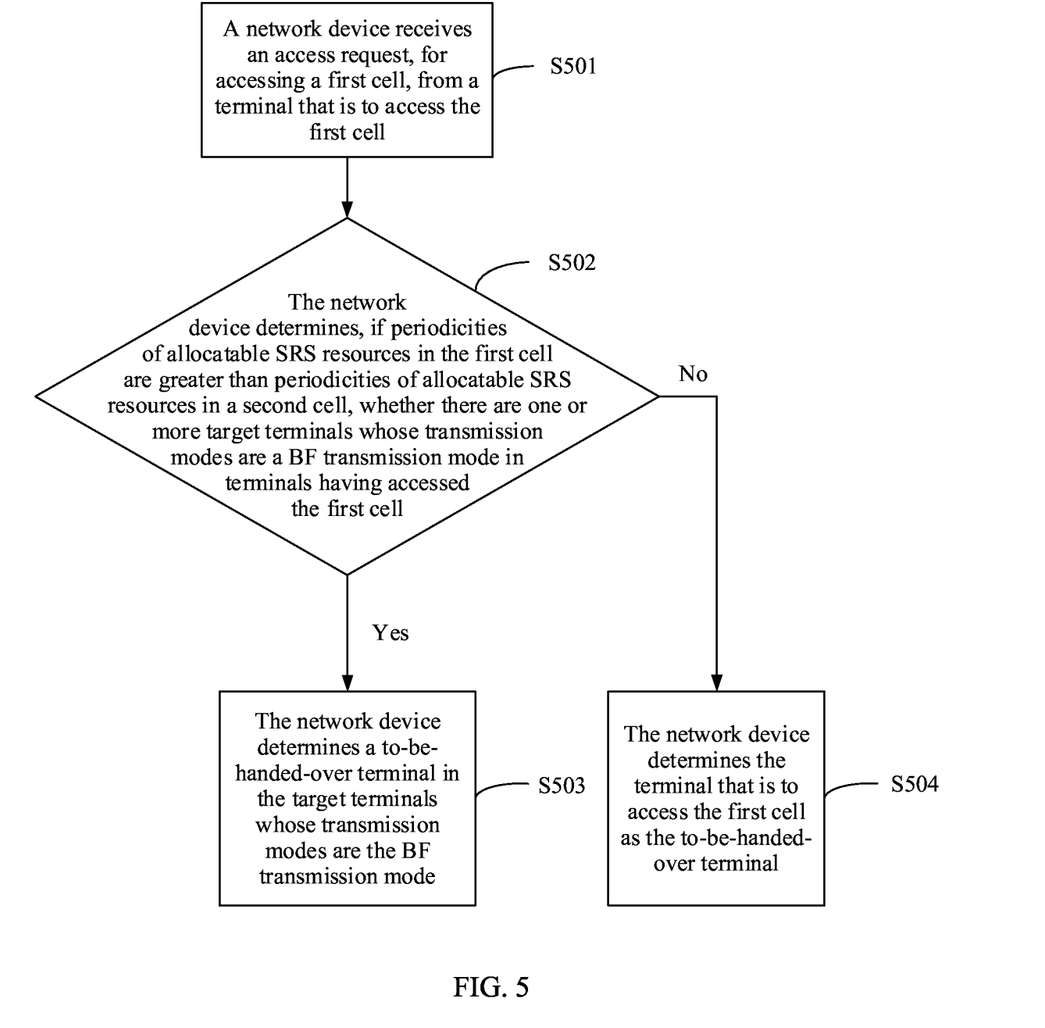
FIG. 5 is a second schematic flowchart of a load balancing method according to an embodiment of this application.

FIG. 5 is a second schematic flowchart of a load balancing method according to an embodiment of this application. As shown in FIG. 5, the method includes the following steps:

S501. A network device receives an access request, for accessing a first cell, from a terminal that is to access the first cell.

S502. The network device determines, if periodicities of allocatable sounding reference signal SRS resources in the first cell are greater than periodicities of allocatable SRS resources in a second cell, whether there are one or more target terminals whose transmission modes are a beamforming BF transmission mode in terminals having accessed the first cell; and if yes, perform S504, or if no, perform S505.

S503. The network device determines a to-be-handed-over terminal in the target terminals whose transmission modes are the BF transmission mode.

S504. The network device determines the terminal that is to access the first cell as the to-be-handed-over terminal.

In this embodiment, the terminal that is to access the first cell sends the access request, for accessing the first cell, to the network device, and after receiving the access request, the network device triggers a load balancing process.

After the network device determines that the periodicities of the allocatable SRS resources in the first cell are greater than the periodicities of the allocatable SRS resources in the second cell, if there are one or more target terminals whose transmission modes are the beamforming BF transmission mode in the terminals having accessed the first cell, the network device determines the to-be-handed-over terminal in the target terminals whose transmission modes are the BF transmission mode. For specific implementation of determining the to-be-handed-over terminal, refer to the embodiment shown in FIG. 4, and details are not described herein again in this embodiment.

If it is determined that there is no target terminal whose transmission mode is the BF transmission mode in the terminals having accessed the first cell, it indicates that there is no terminal that can obtain a BF gain. Therefore, the terminals do not need to be handed over, and the network device directly determines the terminal that is to access the first cell as the to-be-handed-over terminal. The network device may send a handover instruction to the terminal that is to access the first cell, where the handover instruction is used to instruct the terminal that is to access the first cell to be handed over to the second cell.

After the terminal that is to access the first cell accesses the second cell, a periodicity of an SRS resource, allocated to the terminal that is to access the first cell, in the second cell is less than a periodicity of an SRS resource, allocated to the terminal that is to access the first cell, in the first cell, so that the terminal that is to access the first cell can obtain an SRS resource whose periodicity is shorter, and there is an opportunity to obtain a BF gain.

In this embodiment, after receiving the access request, for accessing the first cell, from the terminal that is to access the first cell, the network device triggers the load balancing process. If it is determined that there are one or more target terminals whose transmission modes are the beamforming BF transmission mode in the terminals having accessed the first cell, the network device determines the terminal that is to access the first cell as the to-be-handed-over terminal, so that the terminal that is to access the first cell can obtain the SRS resource whose periodicity is shorter, and there is an opportunity to obtain or increase the BF gain.

Figure 6:
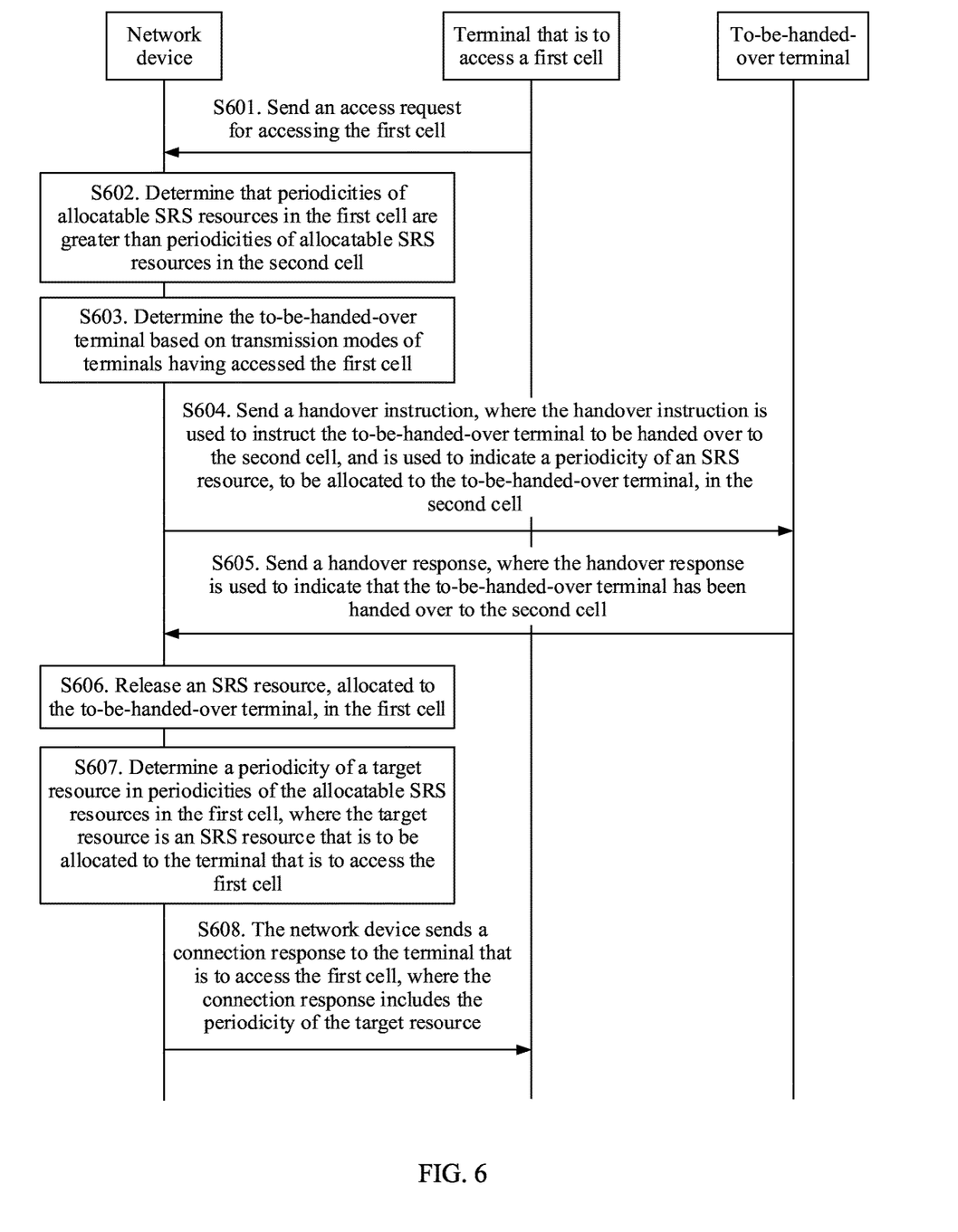
FIG. 6 is a third schematic flowchart of a load balancing method according to an embodiment of this application.

FIG. 6 is a third schematic flowchart of a load balancing method according to an embodiment of this application. As shown in FIG. 6, the method includes the following steps:

S601. A terminal that is to access a first cell sends an access request, for accessing the first cell, to a network device.

S602. The network device determines that periodicities of allocatable SRS resources in the first cell are greater than periodicities of allocatable SRS resources in the second cell.

S603. The network device determines a to-be-handed-over terminal based on transmission modes of terminals having accessed the first cell.

S604. The network device sends a handover instruction to the to-be-handed-over terminal, where the handover instruction is used to instruct the to-be-handed-over terminal to be handed over to the second cell, and is used to indicate a periodicity of an SRS resource, to be allocated to the to-be-handed-over terminal, in the second cell.

S605. The to-be-handed-over terminal sends a handover response to the network device, where the handover response is used to indicate that the to-be-handed-over terminal has been handed over to the second cell.

S606. The network device releases an SRS resource, allocated to the to-be-handed-over terminal, in the first cell.

S607. The network device determines a periodicity of a target resource in the periodicities of the allocatable SRS resources in the first cell, where the target resource is an SRS resource that is to be allocated to the terminal that is to access the first cell.

S608. The network device sends a connection response to the terminal that is to access the first cell, where the connection response includes the periodicity of the target resource.

A difference between this embodiment and the foregoing embodiment in FIG. 5 lies in that, in this embodiment, after the network device receives the access request, for accessing the first cell, sent by the terminal that is to access the first cell, when a load balancing mechanism is triggered, the network device can determine, after determining that the periodicities of the allocatable SRS resources in the first cell are greater than the periodicities of the allocatable SRS resources in the second cell, the to-be-handed-over terminal based on the transmission modes of the terminals having accessed the first cell. That is, the to-be-handed-over terminal is determined in the terminals having accessed the first cell. For a specific determining process, refer to the embodiment shown in FIG. 4, and details are not described herein again in this embodiment.

After the to-be-handed-over terminal is determined in the terminals having accessed the first cell, the network device sends the handover instruction to the to-be-handed-over terminal, where the handover instruction is used to instruct the to-be-handed-over terminal to be handed over to the second cell. Optionally, the handover instruction may further indicate the periodicity of the SRS resource, to be allocated to the to-be-handed-over terminal, in the second cell.

After the to-be-handed-over terminal is successfully handed over to the second cell, the to-be-handed-over terminal sends the handover response to the network device, where the handover response is used to indicate that the to-be-handed-over terminal has been handed over to the second cell. Therefore, the network device releases the SRS resource, allocated to the to-be-handed-over terminal, in the first cell. In this case, the allocatable SRS resources in the first cell increase. The network device determines the periodicity of the target resource in the allocatable SRS resources in the first cell, where the target resource is the SRS resource that is to be allocated to the terminal that is to access the first cell. Specifically, the periodicity of the target resource is a periodicity of a resource whose periodicity is the shortest.

After determining the SRS resource of the terminal that is to access the first cell, the network device sends the connection response to the terminal that is to access the first cell, and the connection response includes the periodicity of the target resource. Optionally, the network device further determines a transmission mode of the terminal that is to access the first cell, and the connection response further includes the transmission mode of the terminal that is to access the first cell.

In this embodiment, after receiving the access request, sent by the terminal that is to access the first cell, for accessing the first cell, the network device triggers a load balancing process. When there is the to-be-handed-over terminal that can be handed over, the network device controls the to-be-handed-over terminal to be handed over to the second cell, so that the SRS resource of the to-be-handed-over terminals in the first cell can be released. In this way, the to-be-handed-over terminal can increase a BF gain in the second cell, and the terminal that is to access the first cell can obtain a short-periodicity SRS resource from the first cell, so that there is an opportunity to obtain a BF gain.

Figure 7:
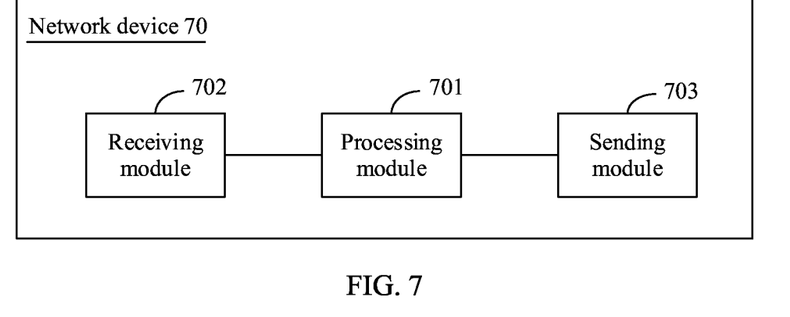
FIG. 7 is a schematic structural diagram of a network device according to an embodiment of this application.

FIG. 7 is a schematic structural diagram of a network device according to an embodiment of this application. As shown in FIG. 7, the network device 70 includes a processing module 701, a receiving module 702, and a sending module 703.

The processing module 701 is configured to determine, if periodicities of allocatable sounding reference signal SRS resources in a first cell are greater than periodicities of allocatable SRS resources in a second cell, a to-be-handed-over terminal based on transmission modes of terminals having accessed the first cell, where the first cell and the second cell are cells in a multi-carrier co-coverage network, and the network device covers the first cell and the second cell.

The processing module 701 is further configured to hand over the to-be-handed-over terminal to the second cell, where a periodicity of an SRS resource, allocated to the to-be-handed-over terminal, in the second cell is less than a periodicity of an SRS resource, allocated to the to-be-handed-over terminal, in the first cell.

In a possible design, the processing module 701 is specifically configured to:

determine, if there are one or more target terminals whose transmission modes are a beamforming BF transmission mode in the terminals having accessed the first cell, the to-be-handed-over terminal in the target terminals, where an SRS resource corresponding to the BF transmission mode is an SRS resource whose periodicity is less than a preset periodicity.

In a possible design, the processing module 701 is specifically configured to:

determine the to-be-handed-over terminal based on periodicities of SRS resources allocated to the target terminals, where the periodicity of the SRS resource, allocated to the to-be-handed-over terminal, in the first cell is greater than a shortest periodicity of the allocatable SRS resources in the second cell.

In a possible design, the processing module 701 is further configured to:

determine, if there is no target terminal whose transmission mode is the BF transmission mode in the terminals having accessed the first cell, a terminal that is to access the first cell as the to-be-handed-over terminal.

In a possible design, the processing module 701 is specifically configured to send a handover instruction to the to-be-handed-over terminal through the sending module 703, where the handover instruction is used to instruct the to-be-handed-over terminal to be handed over to the second cell.

The processing module 701 is specifically configured to receive, from the to-be-handed-over terminal through the receiving module 702, a handover response used to indicate that the handover succeeds.

In a possible design, the processing module 701 is specifically configured to receive, through the receiving module 702, an access request from the terminal that is to access the first cell.

The processing module 701 is further configured to: after handing over the to-be-handed-over terminal to the second cell, release the SRS resource, allocated to the to-be-handed-over terminal, in the first cell; and determine a periodicity of a target resource in periodicities of the allocatable SRS resources in the first cell, where the target resource is an SRS resource that is to be allocated to the terminal that is to access the first cell.

The processing module 701 is further configured to: send, through the sending module 703, a connection response to the terminal that is to access the first cell, where the connection response includes the periodicity of the target resource.

In a possible design, the processing module 701 is further configured to: before sending the connection response to the terminal that is to access the first cell, determine a transmission mode of the terminal that is to access the first cell, where the connection response further includes the transmission mode of the terminal that is to access the first cell.

In a possible design, the processing module 701 is further configured to: receive, before handing over the to-be-handed-over terminal to the second cell, an SRS sent by a terminal, having accessed the first cell, whose transmission mode is the BF transmission mode; and adjust an antenna array of the network device based on the SRS.

The network device provided in this embodiment may be used to perform the foregoing load balancing method, and implementation principles and technical effects of the network device are similar to those of the load balancing method. Details are not described herein again in this embodiment.

The module division is merely logical function division and there may be another division method during actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electrical, mechanical, or other forms.

The modules described as separate parts may or may not be physically separate, and parts displayed as modules may or may not be physical modules, may be located in one position, or may be distributed on a plurality of network modules. Some or all of the modules may be selected based on actual requirements to achieve the objectives of the solutions of the embodiments.

In addition, functional modules in the embodiments of this application may be integrated into one processing module, or each of the modules may exist alone physically, or two or more modules may be integrated into one module.

Figure 8:
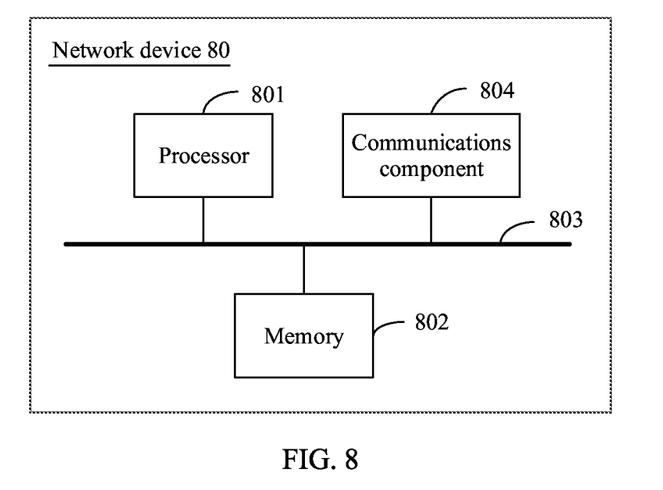
FIG. 8 is a schematic diagram of a hardware structure of a network device according to an embodiment of this application.

FIG. 8 is a schematic diagram of a hardware structure of a network device according to an embodiment of this application. As shown in FIG. 8, the network device 80 includes at least one processor 801 and a memory 802.

The memory 802 is configured to store a computer-executable instruction.

The processor 801 is configured to execute the computer-executable instruction stored in the memory, to implement the steps performed by the network device in the embodiments in FIG. 1 to FIG. 6 in the method embodiments. For details, refer to related descriptions in the foregoing method embodiments.

Optionally, the memory 802 may be independent, or may be integrated with the processor 801.

When the memory 802 is a component independent of the processor 801, the network device 80 may further include a bus 803, configured to connect the memory 802 and the processor 801.

Optionally, the network device 80 may further include a communications component 803, configured to complete a sending or receiving action. The communications component 803 may include a transmitter and a receiver, or may be a device integrating sending and receiving functions.

The network device 80 provided in this embodiment may be configured to perform the method performed by the network device in the foregoing embodiments, and implementation principles and technical effects of the network device are similar to those of the method performed by the network device in the foregoing embodiments. Details are not described herein again in this embodiment.

This embodiment further provides a computer-readable storage medium, where the computer-readable storage medium stores a computer-executable instruction, and when the computer-executable instruction is executed, the methods shown in FIG. 1 to FIG. 6 are implemented.

An embodiment of this application further provides a computer program product, where the computer program product includes computer program code, and when the computer program code is run on a computer, the computer is enabled to perform the methods performed by the network device that are shown in FIG. 1 to FIG. 6.

An embodiment of this application further provides a chip, including a memory and a processor, where the memory is configured to store a computer-executable instruction, and the processor is configured to invoke the computer-executable instruction from the memory and run the computer-executable instruction, so that the chip performs the foregoing methods implemented by the network device.

It should be understood that, in the foregoing embodiments, the processor may be a central processing unit (CPU), or may be another general purpose processor, a digital signal processor (DSP), an application-specific integrated circuit (ASIC), or the like. The general purpose processor may be a microprocessor, or the processor may be any conventional processor, or the like. The steps of the methods disclosed with reference to the present application may be directly performed and completed by a hardware processor, or may be performed and completed by using a combination of hardware and a software module in the processor.

The memory may include a high-speed random access memory (RAM) memory, and may further include a non-volatile memory NVM, for example, at least one magnetic disk storage.

The bus may be an industrial standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of this application is not limited to only one bus or only one type of bus.

The computer-readable storage medium and the readable storage medium may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. The readable storage medium may be any available medium accessible to a general-purpose or special-purpose computer.

For example, a readable storage medium is coupled to the processor, so that the processor can read information from the readable storage medium, and write information into the readable storage medium. Certainly, the readable storage medium may alternatively be a constituent part of the processor. The processor and the readable storage medium may be located in an ASIC. Certainly, the processor and the readable storage medium may alternatively exist in the device as discrete assemblies.

If the functions are implemented in a form of a software functional unit and sold or used as an independent product, the functions may be stored in a computer-readable storage medium. Based on such an understanding, the technical solutions of this application essentially, or a part contributing to the prior art, or a part of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a ROM, a RAM, a magnetic disk, or an optical disc.

What is claimed is:

1. A method, comprising:
when first periodicities of first allocatable sounding reference signal (SRS) resources in a first cell are greater than second periodicities of second allocatable SRS resources in a second cell, determining, by a network device, a to-be-handed-over terminal based on transmission modes of terminals having accessed the first cell, wherein the first cell and the second cell are cells in a multi-carrier co-coverage network, wherein the network device covers the first cell and the second cell, and wherein the determining the to-be-handed-over terminal comprises:
when there are one or more target terminals whose transmission modes are a beamforming (BF) transmission mode in the terminals having accessed the first cell, determining, by the network device, the to-be-handed-over terminal in the one or more target terminals, wherein a periodicity of an SRS resource corresponding to the BF transmission mode is less than a preset periodicity; and
handing over, by the network device, the to-be-handed-over terminal to the second cell, wherein a second periodicity of a second SRS resource allocated to the to-be-handed-over terminal in the second cell is less than a first periodicity of a first SRS resource allocated to the to-be-handed-over terminal in the first cell.

2. The method according to claim 1, wherein the determining the to-be-handed-over terminal in the one or more target terminals comprises:

determining, by the network device, the to-be-handed-over terminal based on periodicities of SRS resources allocated to the one or more target terminals, wherein the first periodicity of the first SRS resource allocated to the to-be-handed-over terminal in the first cell is greater than a shortest periodicity of the second allocatable SRS resources in the second cell.

3. The method according to claim 1, wherein the method further comprises:
when there is no target terminal whose transmission mode is the BF transmission mode in the terminals having accessed the first cell, determining, by the network device, a terminal that is to access the first cell as the to-be-handed-over terminal.

4. The method according to claim 1, wherein the handing over the to-be-handed-over terminal to the second cell comprises:
sending, by the network device, a handover instruction to the to-be-handed-over terminal, wherein the handover instruction instructs the to-be-handed-over terminal to be handed over to the second cell; and
receiving, by the network device from the to-be-handed-over terminal, a handover response indicating that the handing over succeeds.

5. The method according to claim 1, wherein the method further comprises:
receiving, by the network device, an access request from a terminal that is to access the first cell; and
after the handing over:
releasing, by the network device, the first SRS resource allocated to the to-be-handed-over terminal in the first cell;
determining a periodicity of a target resource in the first periodicities of the first allocatable SRS resources in the first cell, wherein the target resource is to be allocated to the terminal that is to access the first cell; and
sending, by the network device, a connection response to the terminal that is to access the first cell, wherein the connection response comprises the periodicity of the target resource.

6. The method according to claim 5, wherein the method further comprises:
before the sending the connection response:
determining, by the network device, a transmission mode of the terminal that is to access the first cell, wherein the connection response further comprises the transmission mode of the terminal that is to access the first cell.

7. The method according to claim 1, wherein the method further comprises:
before the handing over:
receiving, by the network device, an SRS sent by a terminal having accessed the first cell, the terminal's transmission mode being a BF transmission mode; and
adjusting, by the network device, an antenna array of the network device based on the SRS.

8. A network device, comprising:
at least one processor; and
a non-transitory computer readable storage medium storing programming, the programming including instructions for execution by the at least one processor to perform operations of:
when first periodicities of first allocatable sounding reference signal (SRS) resources in a first cell are greater than second periodicities of second allocatable SRS resources in a second cell, determining a to-be-handed-over terminal based on transmission modes of terminals having accessed the first cell, wherein the first cell and the second cell are cells in a multi-carrier co-coverage network, wherein the network device covers the first cell and the second cell, and wherein the determining the to-be-handed-over terminal comprises:
when there are one or more target terminals whose transmission modes are a beamforming (BF) transmission mode in the terminals having accessed the first cell, determining, by the network device, the to-be-handed-over terminal in the one or more target terminals, wherein a periodicity of an SRS resource corresponding to the BF transmission mode is less than a preset periodicity; and
handing over the to-be-handed-over terminal to the second cell, wherein a second periodicity of a second SRS resource allocated to the to-be-handed-over terminal in the second cell is less than a first periodicity of a first SRS resource allocated to the to-be-handed-over terminal in the first cell.

9. The network device according to claim 8, wherein the determining the to-be-handed-over terminal in the one or more target terminals comprises:
determining the to-be-handed-over terminal based on periodicities of SRS resources allocated to the one or more target terminals, wherein the first periodicity of the first SRS resource allocated to the to-be-handed-over terminal in the first cell is greater than a shortest periodicity of the second allocatable SRS resources in the second cell.

10. The network device according to claim 8, the operations further comprising:
when there is no target terminal whose transmission mode is the BF transmission mode in the terminals having accessed the first cell, determining a terminal that is to access the first cell as the to-be-handed-over terminal.

11. The network device according to claim 8, the operations further comprising:
sending a handover instruction to the to-be-handed-over terminal, wherein the handover instruction instructs the to-be-handed-over terminal to be handed over to the second cell; and
receiving, from the to-be-handed-over terminal, a handover response indicating that the handing over succeeds.

12. The network device according to claim 8, the operations further comprising:
receiving, by the network device, an access request from a terminal that is to access the first cell; and
after the handing over:
releasing, by the network device, the first SRS resource allocated to the to-be-handed-over terminal in the first cell;
determining a periodicity of a target resource in the first periodicities of the first allocatable SRS resources in the first cell, wherein the target resource is to be allocated to the terminal that is to access the first cell; and
sending, by the network device, a connection response to the terminal that is to access the first cell, wherein the connection response comprises the periodicity of the target resource.

13. The network device according to claim 12, the operations further comprising:
before the sending the connection response:

determining, by the network device, a transmission mode of the terminal that is to access the first cell, wherein the connection response further comprises the transmission mode of the terminal that is to access the first cell.

14. The network device according to claim 8, the operations further comprising:

before the handing over:

receiving, by the network device, an SRS sent by a terminal having accessed the first cell, the terminal's transmission mode being a BF transmission mode; and adjusting, by the network device, an antenna array of the network device based on the SRS.

15. A non-transitory computer-readable storage medium having instructions stored thereon that, when executed by a network device, cause the network device to perform operations, the operations comprising:

when first periodicities of first allocatable sounding reference signal (SRS) resources in a first cell are greater than second periodicities of second allocatable SRS resources in a second cell, determining a to-be-handed-over terminal based on transmission modes of terminals having accessed the first cell, wherein the first cell and the second cell are cells in a multi-carrier co-coverage network, wherein the network device covers the first cell and the second cell, and wherein the determining the to-be-handed-over terminal comprises:

when there are one or more target terminals whose transmission modes are a beamforming (BF) transmission mode in the terminals having accessed the first cell, determining, by the network device, the to-be-handed-over terminal in the one or more target terminals, wherein a periodicity of an SRS resource corresponding to the BF transmission mode is less than a preset periodicity; and handing over the to-be-handed-over terminal to the second cell, wherein a second periodicity of a second SRS resource allocated to the to-be-handed-over terminal in the second cell is less than a first periodicity of a first SRS resource allocated to the to-be-handed-over terminal in the first cell.

16. The non-transitory computer-readable storage medium according to claim 15, wherein the determining the to-be-handed-over terminal in the one or more target terminals comprises:

determining the to-be-handed-over terminal based on periodicities of SRS resources allocated to the one or more target terminals, wherein the first periodicity of the first SRS resource allocated to the to-be-handed-over terminal in the first cell is greater than a shortest periodicity of the second allocatable SRS resources in the second cell.

17. The non-transitory computer-readable storage medium according to claim 15, the operations further comprising:

when there is no target terminal whose transmission mode is the BF transmission mode in the terminals having accessed the first cell, determining a terminal that is to access the first cell as the to-be-handed-over terminal.

* * * * *